United States Patent
Robins et al.

(10) Patent No.: US 6,467,049 B1
(45) Date of Patent: Oct. 15, 2002

(54) METHOD AND APPARATUS FOR CONFIGURATION IN MULTI PROCESSING ENGINE COMPUTER SYSTEMS

(75) Inventors: Kristen Marie Robins; Ronnie B. Kon, both of San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/419,348

(22) Filed: Oct. 15, 1999

(51) Int. Cl.$^7$ .............................................. G06F 11/16

(52) U.S. Cl. ........................... 714/13; 714/10; 713/202

(58) Field of Search ........................... 713/202; 714/10, 714/11, 12, 13, 36, 3

(56) References Cited

U.S. PATENT DOCUMENTS

| | | | |
|---|---|---|---|
| 4,823,256 A | * 4/1989 | Bishop et al. | 700/82 |
| 5,003,595 A | 3/1991 | Collins et al. | 380/25 |
| 5,163,147 A | 11/1992 | Orita | 395/600 |
| 5,193,204 A | * 3/1993 | Qureshi et al. | 712/35 |
| 5,204,966 A | * 4/1993 | Wittenberg et al. | 700/79 |
| 5,241,594 A | 8/1993 | Kung | 380/4 |
| 5,241,599 A | 8/1993 | Bellovin et al. | 380/21 |
| 5,305,448 A | 4/1994 | Insalaco et al. | 395/425 |
| 5,311,595 A | 5/1994 | Bjerrum et al. | 380/25 |

(List continued on next page.)

FOREIGN PATENT DOCUMENTS

| | | | |
|---|---|---|---|
| WO | 99/53408 | 10/1999 | G06F/15/16 |

OTHER PUBLICATIONS

"Multipath Controls", Sep. 1, 1984, IBM Technical Disclosure Bulletin, Sep. 1984, US, vol. 27, Issue 4B, pp. 2589 2591.*

(List continued on next page.)

*Primary Examiner*—Robert Beausoleil
*Assistant Examiner*—Gabriel Chu
(74) *Attorney, Agent, or Firm*—Thelen Reid & Priest LLP; Masako Ando

(57) ABSTRACT

A high reliability computer system includes a first and a second processing engine (PE), circuitry for switching control of the system from the first PE operating as a primary PE to the second PE upon detection of a failure of the first PE, at least one shared resource associated with both the first and second PEs, at least one dedicated resource associated with the first PE and at least one dedicated resource associated with the second PE, a database associated with and accessible by one of the first and second PEs and a configuration engine. The database contains initialization information for the one PE, including a first class of instructions affecting the shared resource and a second class of instructions affecting the dedicated resource of the one PE. The second class of instructions includes setting an enable password or a surrogate therefor for the one PE. The configuration engine is associated with the one PE and is operable in one of a first mode and a second mode. The configuration engine allows the one PE to execute the first and second classes of instructions in the first mode and allows the one PE to execute the second class of instructions in the second mode. The configuration engine may include a classifier for classifying the instructions into the first and second classes. Alternatively, the configuration engine may include the database having a first memory containing the first and second classes of instructions and a second memory containing the second class of instructions.

29 Claims, 7 Drawing Sheets

U.S. PATENT DOCUMENTS

| | | | |
|---|---|---|---|
| 5,351,136 A | 9/1994 | Wu et al. | 358/440 |
| 5,421,006 A | 5/1995 | Jablon et al. | 395/575 |
| 5,421,012 A | 5/1995 | Khoyi et al. | 395/650 |
| 5,440,635 A | 8/1995 | Bellovin et al. | 380/25 |
| 5,452,448 A | 9/1995 | Sakuraba et al. | 395/600 |
| 5,463,733 A * | 10/1995 | Forman et al. | 710/241 |
| 5,535,411 A * | 7/1996 | Speed et al. | 713/2 |
| 5,584,023 A | 12/1996 | Hsu | 395/620 |
| 5,596,759 A * | 1/1997 | Miller et al. | 709/201 |
| 5,655,077 A | 8/1997 | Jones et al. | 395/187.01 |
| 5,671,354 A | 9/1997 | Ito et al. | 395/187.01 |
| 5,680,461 A | 10/1997 | McManis | 380/25 |
| 5,684,950 A | 11/1997 | Dare et al. | 395/187.01 |
| 5,708,780 A | 1/1998 | Levergood et al. | 395/200.12 |
| 5,742,830 A | 4/1998 | Elko et al. | 395/728 |
| 5,778,365 A | 7/1998 | Nishiyama | 707/9 |
| 5,793,763 A | 8/1998 | Mayes et al. | 370/389 |
| 5,835,727 A | 11/1998 | Wong et al. | 395/200.68 |
| 5,845,070 A | 12/1998 | Ikudome | 395/187.01 |
| 5,898,780 A | 4/1999 | Liu et al. | 380/25 |
| 5,925,099 A | 7/1999 | Futral et al. | 709/204 |
| 5,941,964 A | 8/1999 | Young et al. | 710/100 |
| 5,944,824 A | 8/1999 | He | 713/201 |
| 5,961,586 A | 10/1999 | Pedersen | 709/201 |
| 5,987,232 A | 11/1999 | Tabuki | 395/187.01 |
| 5,991,810 A | 11/1999 | Shapiro et al. | 709/229 |
| 6,006,334 A | 12/1999 | Nguyen et al. | 713/202 |
| 6,011,910 A | 1/2000 | Chau et al. | 395/200.59 |
| 6,018,770 A | 1/2000 | Little et al. | 709/223 |
| 6,021,496 A | 2/2000 | Dutcher et al. | 713/202 |
| 6,044,155 A | 3/2000 | Thomlinson et al. | 380/49 |
| 6,047,376 A | 4/2000 | Hosoe | 713/201 |
| 6,092,196 A | 7/2000 | Reiche | 713/200 |
| 6,141,687 A | 10/2000 | Blair | 709/225 |
| 6,161,139 A * | 12/2000 | Win et al. | 709/223 |
| 6,321,334 B1 * | 11/2001 | Jerger et al. | 713/200 |
| 2002/0026604 A1 * | 2/2002 | Bissett et al. | 714/12 |

OTHER PUBLICATIONS

"Access Control Product Information", Ascend Communications, Inc., 4 pages.

Bellovin, Steven M., "Problem Areas for the IP Security Protocols", Jul. 22–25, 1996, Proceedings of the Sixth Usenix UNIX Security Symposium, San Jose, CA.

Cisco User Control Point, pp. 1–4, printed from http://www.cisco.com/warp.public/728/ucp/ucp ds.htm om Sep. 10, 1998.

IPSec Network Security, pp. 1–69, printed from http://www.cisco.com/univercd/cc/td/doc/products/software/ios113ed/113t/113t 3/ipsec.

Krawczyk, Hugo, "SKEME: A Versatile Secure Key Exchange Mechanism for Internet", 1996, IEEE, Proceedings of the 1996 Symposium on Network and Distributed Systems Security.

Patel, B., et al., "Securing L2TP using IPSEC", May 1998, PPPEXT Working Group, pp. 1–10, printed from http://www.masinter.net/~12tp/ftp/draft–ietf–pppext–12tp–security–02.txt. on Sep. 21, 1998.

"Remote Access Network Security", Ascend Communications, Inc., printed from http://www.ascend.com/1103.html, on Jul. 24, 1998, pp. 1–8.

Rigney, et al., "Remote Authentication Dial In User Service (RADIUS)", Network Working Group, RFC 2138, Apr. 1997, pp. 1–57.

Carrel, D. et al. The TACACS+Protocol, Version 1.78, Cisco Systems, Inc., printed from ftp://ftp–eng.cisco.com/gdweber/tac–rfc.1.78.txt on Oct. 23, 2000.

* cited by examiner

METHOD AND APPARATUS FOR CONFIGURATION IN MULTI PROCESSING ENGINE COMPUTER SYSTEMS

STATEMENT OF RELATED APPLICATION

This application is related to U.S. patent application Ser. No. 09/419,350, entitled "PASSWORD PROTECTION FOR HIGH RELIABILITY COMPUTER SYSTEMS", filed on even date herewith in the names of the same inventors and commonly assigned herewith.

BACKGROUND OF THE INVENTION

1. Field of the Invention

The present invention relates to the field of computer systems and data communications networks. More particularly, the present invention relates to a method and apparatus for providing password protection for multiple processing engines (PEs) in a high reliability computer system such as may be found in a data communications network.

2. The Background

A computer system on a data communications network is potentially accessible by anyone on the network. Since the Internet interconnects various networks, a computer system on such a network is potentially accessible to the tens of millions of people who now access the Internet. Therefore, security is a major requirement for almost all computer systems, so as to protect such computer systems from inadvertent or intentional accesses and undesirable actions.

Password protection is one of the various security devices for restricting or limiting access to a computer system. Passwords may be set in accordance with the mode or nature of commands to be executed on the system; various levels of access may be provided. For example, initial access to the computer system may be secured by setting passwords for individual access lines to the system through its interfaces and ports. Execution of some classes of commands may be allowed only to some privileged users, but not to all users who log in to the system. An ordinary user may execute nondestructive commands such as connecting to remote devices, changing terminal settings on a temporary basis, listing system information, etc. However, potentially destructive commands such as changing configuration parameters that affect the system as a whole, shutting down an interface, rebooting the system, and the like, generally require additional protection. The former commands are referred to as "user mode" commands and are executed in an ordinary user mode, and the latter are referred to as "privileged mode" commands, executable only in one of possibly several privileged modes. Typically, a privileged user is required to enter an enable password to get into the privileged mode after he or she is granted accesses to the user mode. Passwords are typically set during the initial configuration process of the system.

FIG. 1 shows an example of an initialization process which begins with the startup of a computer system, for example, a packet router. In a typical startup initialization process, the system checks the hardware and performs a power-on self-test by executing commands stored in a ROM (read only memory), and then finds and loads operating system (OS) software. The OS software may be loaded, for example, from a flash memory or ROM. Next, the system finds and loads configuration information from a configuration file. If the previously created and saved configuration file is found in a non-volatile random access memory (NVRAM), the configuration file is loaded into a memory (RAM) and executed on a line-by-line basis. This execution of the configuration file defines settings and parameters of interfaces and other hardware in the system, resulting in the system becoming operational.

If no previously created configuration file exists, the OS, such as a Cisco IOS™ product, available from Cisco Systems, Inc. of San Jose, Calif., executes a predefined question-driven configuration display (setup dialog) to a user and creates a basic configuration. The newly created configuration file is stored in the NVRAM and will be loaded as a default at the next initialization process. In the case of routers, for example, the configuration process includes defining router-specific attributes and protocol functions, defining addresses, operating rates and other parameters of interfaces and other hardware, and establishing passwords (including an enable password). The passwords can be changed thereafter by a user who has access to a privileged mode (a user with the enable password).

Reliability is another important requirement for computer systems, especially for computer systems maintaining important information or for those systems the failure of which would significantly affect other systems. Routers are an example of such computer systems requiring high reliability. Routers usually transfer packets of data from one network to another. The failure of a router may affect all networks and hosts that send or receive packets handled by that router. One technique used to realize high reliability in a computer system is to make the system redundant, providing the system with a primary processing engine and a secondary (back-up) processing engine. In such a redundant processing engine system, when the primary processing engine fails, the secondary processing engine can immediately take over the duties of the primary processing engine so as to continue running the system.

A processing engine (PE) usually includes one or more CPUs or microprocessors, , supporting circuitry, a variety of memories such as, DRAM, ROM, static RAM, etc., and a bus. In a symmetric multiprocessing (SMP) system, for example, a PE is a collection of unit processors. A PE may also be implemented as a microcode engine.

FIG. 2 shows operations in a prior art redundant PE system. In such a redundant PE system, when the system is started, the primary PE performs the initialization process for the system. The primary PE configures the system by loading and executing the configuration file thereof, during which an enable password for the primary PE (along with other passwords for the system) is set so as to protect the system. The secondary PE waits for the primary PE to fail, and then takes over the system after the failure of the primary PE is detected. Such a failover may take place when a failure of the hardware or a severe problem in the software occurs. For example, when a bus error or a segmentation violation occurs, it may be better to switch to a back up PE via a seamless take-over from the original PE rather than to attempt to resolve the problem on the original PE.

The failure may be detected by the lack of or issuance of a specific indication signal from the primary PE. Once the secondary PE takes over the system, it reboots the failed PE and performs reinitialization. At this point the secondary PE loads and executes its own configuration file (the configuration may or may not be the same as that of the primary PE). An enable password and other passwords are set for the secondary PE in this configuration process, and the system is password-protected as well.

In many computer systems, such as network routers, the operating system uses a command line interface (CLI). In a CLI-based system, commands are executed regardless of whether the commands are entered by a user, for example, from a console, or read from an executable file such as a configuration file. Thus, in a CLI-based system, loading a configuration file into a memory causes all configuration commands in the file to be executed. Therefore, if the secondary PE in a redundant PE system reads its configuration file, it would potentially redefine or alter all of the settings and parameters of the interfaces and other hardware of the system, which are still under the control of the primary PE. For this reason, in a conventional redundant PE system using a CLI, the secondary PE is not allowed to load the configuration file into its memory until the primary PE fails.

There are some situations where it is desirable for a redundant PE system to make certain commands available to the secondary PE before the primary PE fails. For example, suppose that in a router the primary PE is handling all routing functions, and the secondary PE is monitoring the primary PE waiting for it to fail. The primary PE could be signaling on a communications link, such as a backplane line, once per second as a result of a high-priority interrupt to let the secondary PE know that all is fine, but actually the primary PE is in an endless loop in a slightly lower priority interrupt. In this situation the primary PE has failed, but it is indicating to the secondary PE that it has not failed, thereby preventing the secondary PE from taking over. In such a case, a system administrator may want to reboot the primary PE to fix the situation, forcing the primary PE to fail and allowing the secondary PE to take over. Such a forced failover may be caused by having the system administrator issue a command (presumably a privileged mode command) through a console port for the secondary PE.

However, because the secondary PE is prohibited from loading its configuration file until the first PE fails, it has no password protection until that time comes. If the system allows a user to obtain access to such privileged mode (without an enable password) through the second console, anyone with access to the second console can issue any destructive or privileged commands, for example, changing the configuration and then causing a forced failover at will. Such unrestricted issuance of commands without password protection poses a risk to the computer system. For example, some loss of information is almost inevitable if a failover occurs. Repeated forced failovers may lead to serious consequences. In addition, the performance of the secondary PE may be lower than that of the primary PE, so that a forced failover could cause lower performance in the system than desired. Thus, the prior art redundant PE system can improve its reliability only at the cost of its security.

SUMMARY OF THE INVENTION

A high reliability computer system includes a first processing engine (PE) and a second processing engine (PE), circuitry for switching control of the system from the first PE operating as a primary PE to the second PE upon detection of a failure of the first PE, at least one shared resource associated with both the first and second PEs, at least one dedicated resource associated with the first PE and at least one dedicated resource associated with the second PE, a database associated with and accessible by one of the first and second PEs and a configuration engine. The database contains initialization information for the one PE, including a first class of instructions affecting the shared resource and a second class of instructions affecting the dedicated resource of the one PE. The second class of instructions includes setting an enable password or a surrogate therefor for the one PE. The configuration engine is associated with the one PE and is operable in one of a first mode and a second mode. The configuration engine allows the one PE to execute the first and second classes of instructions in the first mode and allows the one PE to execute the second class of instructions in the second mode. The configuration engine may include a classifier for classifying the instructions into the first and second classes. Alternatively, the configuration engine may include the database having a first memory containing the first and second classes of instructions and a second memory containing the second class of instructions.

DETAILED DESCRIPTION OF PREFERRED EMBODIMENTS

Those of ordinary skill in the art will realize that the following description of the present invention is illustrative only and not in any way limiting. Other embodiments of the invention will readily suggest themselves to such skilled persons having the benefit of this disclosure.

Figure 1:
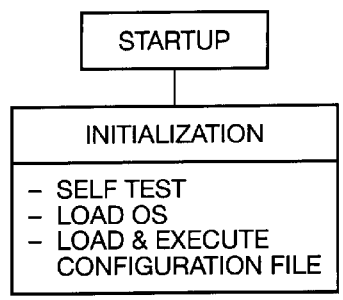
FIG. 1 is a process flow diagram illustrating an example of initialization process which begins with the startup of a computer system.
Figure 2:
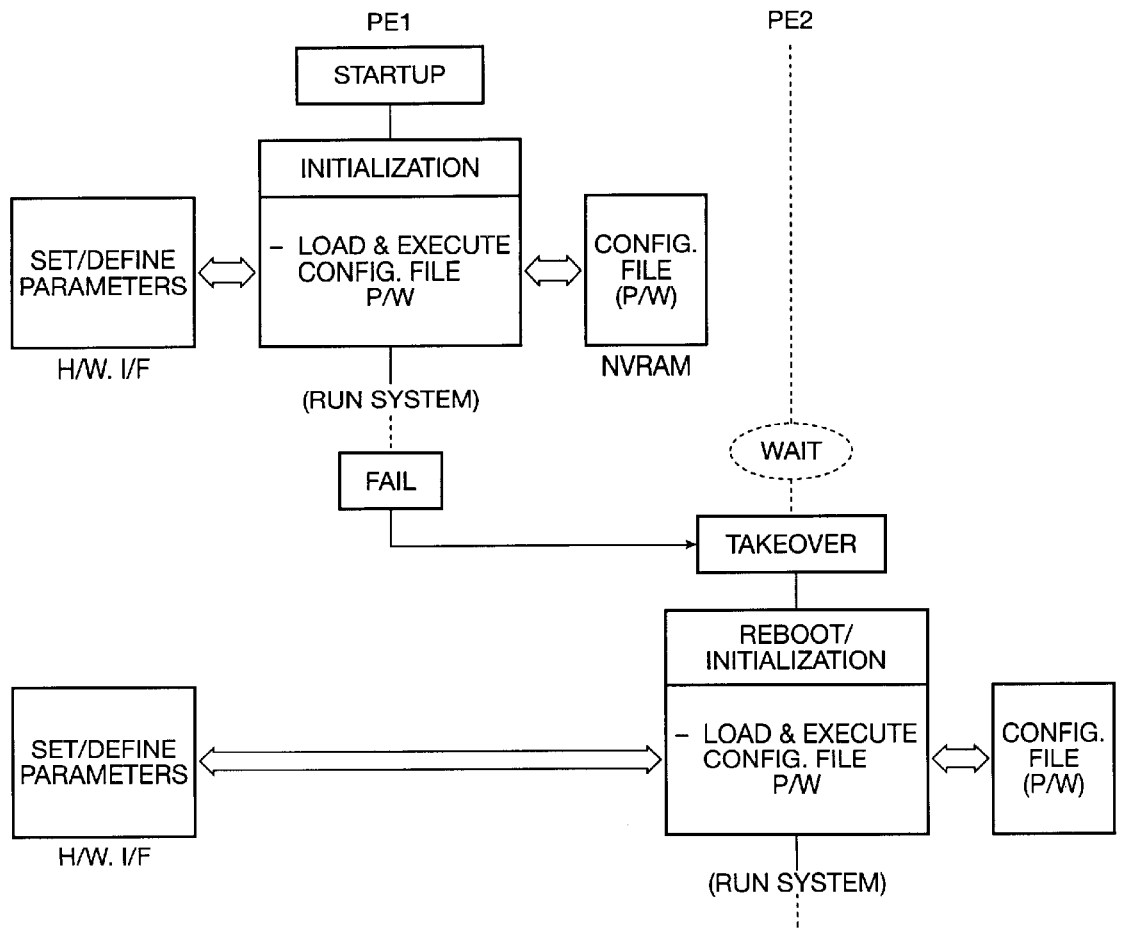
FIG. 2 is a process flow diagram illustrating operations in a prior art redundant PE system.
Figure 3:
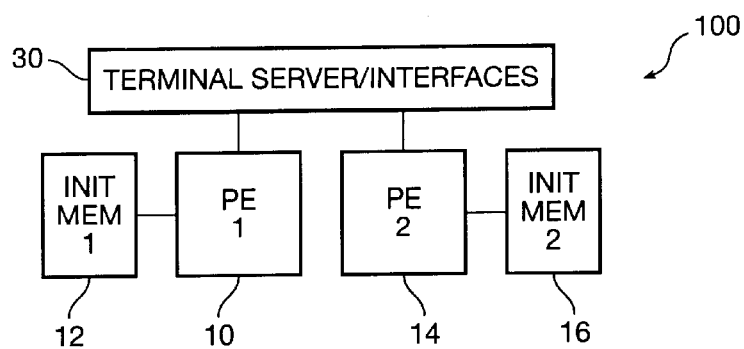
FIG. 3 is a system block diagram schematically illustrating a high reliability computer system according to a presently preferred embodiment of the present invention.

FIG. 3 schematically shows a high reliability computer system 100 according to a presently preferred embodiment of the present invention. Such a system may, for example, control a piece of computer networking equipment such as a router or switch. The computer system 100 includes a first PE 10 (operating as the primary PE), a first memory 12, a second PE 14 (operating as a secondary PE), and a second memory 16. The first memory 12 is accessible by the first PE 10 and contains initialization information for the first PE 10. The second memory 16 is accessible by the second PE 14 and contains initialization information for the second PE 14. The initialization information typically includes a configuration file to configure the system software and hardware such as terminal server and/or interfaces 30. The first and second memories 12 and 16 are typically non-volatile memories, such as NVRAM, PCMCIA flash memory cards, hard disks, and the like.

The first PE 10 is the primary PE controlling the system 100. When a failure of the first PE 10 is detected, however, switching circuitry (not shown) switches control of the system 100 to the second PE 14. The second PE 14 has been waiting for the first PE 10 to fail, and when the first PE 10 fails, the control of the system 100 is switched to the second PE 14. Such a failover may take place when a failure of the hardware or a severe problem in the software occurs. For example, when a bus error or a segmentation violation occurs, it may be better to switch to the second PE 14 from the first PE 10 rather than to attempt to resolve the problem on the first PE 10. This seamless switching allows the computer system 100 to continue running, realizing high reliability of the system.

The failure of the first PE 10 may be detected, for example, by the lack of a predetermined signal, or the issuance of a predefined signal, from the first PE 10. The switching circuitry may be implemented in a controller or a chipset in any convenient location in the system 100, as is well understood by those of ordinary skill in the art.

The computer system 100 further includes a configuration engine capable of operating in multiple modes including at least a first mode and a second mode. In the first mode, the configuration engine parses the initialization information in an ordinary manner, by reading all instructions (or commands) in the configuration file. In the second mode, the configuration engine parses the initialization information so that it reads only a certain class (or classes) of instructions and ignores all other instructions that are not so classified. The configuration engine may preferably be implemented in the second PE 14, or in a controller of a CPU card that includes the second PE 14. The second PE 14 executes the instructions read by the configuration engine, but does not execute those ignored by the configuration engine. The configuration engine of the present invention is applicable for any system using a command line interface (CLI).

The initialization information includes various configuration information and instructions. For instance, in the case of a router, some configuration instructions deal with overall operation of the router, such as defining the router's name or identification, setting the enable password, and selecting which internet protocols are to be supported by the router. On the other hand, other configuration instructions affect specific devices or components, such as setting interface parameters, defining operation of the protocols running on individual interfaces, and defining addresses for the interfaces and ports.

According to one embodiment of the present invention, instructions contained in the initialization information for a PE are categorized into two classes: instructions involving and/or affecting shared resources and those involving and/or affecting resources dedicated to the respective PE. Here, "dedicated" resources are circuitry and devices such as interfaces solely controlled by a specific PE in a multiple PE system. The dedicated resources may or may not be physically directly attached to a certain PE; however, they are directly controlled by that PE. For instance, a console port for a certain PE is one of the dedicated resources associated with that PE. Examples of the instructions involving dedicated resources include setting an enable password for the PE and setting parameters for the console port of the PE. "Shared" resources are circuitry and devices controlled by either PE. For example, an Ethernet card for facilitating the system's communication with other computer systems or servers is also shared circuitry and any interface in a line card is shared by PEs of the system. Instructions defining the system's routing protocols also embrace the shared resources, because such protocols run on and are configured for the corresponding individual interfaces shared by the PEs.

The first PE 10 and the first memory 12 may be provided on one CPU card (first CPU card), and the second PE 14 and the second memory 16 may be provided on another CPU card (second CPU card). Each CPU card may include, for example, a console port, random access memory (RAM), and read-only memory (ROM) for its PE. In such a case, dedicated resources are the circuitry and devices attached to the CPU card, and shared resources are those which are located physically off of the CPU card. In a multi-CPU card system, the switching circuitry may switch the control of the system from the first CPU card to the second CPU card when the failure or malfunction of the first CPU card is detected. Note that those of ordinary skill in the art will recognize that this one CPU per PE card architecture is used herein only as an example and is not a requirement.

The instructions involving shared resources are referred to herein as a first class of instructions, and those involving dedicated resources are referred to as a second class of instructions. Thus, the initialization information for the second PE 14 includes the first class of instructions and the second class of instructions. The configuration engine parses, in its first mode, the initialization information for the second PE 14 by reading all of the first and second class of instructions. The configuration engine performs in its second mode by reading only the second class of instructions and ignoring the first class of instructions.

Figure 4A:
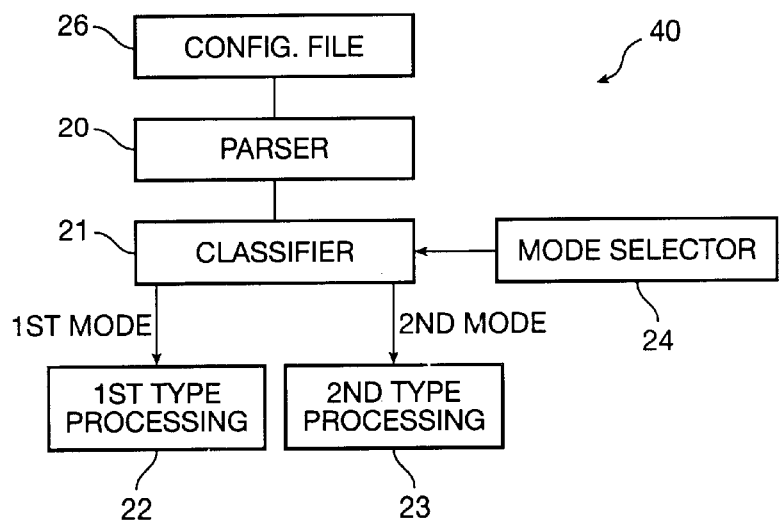
FIG. 4A is a functional block diagram schematically illustrating a configuration engine according to a presently preferred embodiment of the present invention.

FIG. 4A schematically shows functional components of the configuration engine 40 according to one embodiment of the present invention. The configuration engine 40 includes a parser 20 and a classifier 21. The parser 20 reads initialization information from the configuration file 26, and the classifier 21 identifies the nature of the instructions (or commands) and categorizes the instructions into classes according to the identified nature. According to one embodiment of the present invention, the classifier 21 classifies the instructions based on whether an instruction involves the shared resources or dedicated resources, as defined above. This can be done, for instance, with a lookup table or any other convenient mechanism. For example, a command for configuring interface parameters such as IP addresses, which involves the shared resources of the system 100, is classified in the first class of instructions. A command for setting an enable password of the second PE 14 or a parameter for the console port of the second PE 14, which involves the resources dedicated to the second PE 14, is classified in the second class of instructions.

In the first mode, the classifier 21 passes the first and second classes of instructions to be executed by the second PE 14, resulting in the first type of processing 22. In the first type of processing 22, the second PE 14 performs the full configuration. In the second mode, the classifier 21 passes only the second class of instructions to be executed, resulting in the second type of processing 23. In the second type of processing 23, the second PE 14 only performs a partial configuration. This may be done, for instance, if the classifier 21 does not perform the classification in the first mode so that all the instructions read from the configuration file 26 are executed accordingly. In the second mode, the classifier 21 conducts the classification, and ignores the first class of instructions and passes the second class of instructions, so that only the second class of instructions are executed.

Submode commands are commands which introduce a subordinate and related series of commands. For example, a submode command may be issued that specifies that all subsequent commands relate to a specific serial interface, until that submode is later exited. A command relating to a serial interface may be followed by instructions for displaying a text description in the output of that command and then shutting down the serial interface. All the instructions introduced under the first command are classified into the first class along with the first command, even though displaying the text description itself does not touch the serial interface or the shared resources.

The configuration engine 40 may include a mode selector 24 for selecting its operation mode. The mode selector 24 may simply apply a mode flag to the classifier 21, which indicates the PE that is currently running and controlling the system 100. When the mode flag indicates that the first PE 10 is controlling the system 100 as the primary PE and thus the second PE 14 is operating as the secondary, the classifier 21 operates in the first mode. If the mode flag indicates that the second PE 14 is controlling the system as the primary PE, the classifier 21 operates in the second mode.

The mode selector 24 may also select the second mode when the second PE 14 is reinitializing the computer system 100, or when the failure of the first PE 10 has been detected. The failure of the first PE 10 may be indicated by a lack of or issuance of a predefined signal from the first PE 10. In addition, the mode selector 24 may have a default setting in the second mode, so that the classifier 21 performs the classification unless the mode flag or the like indicates otherwise.

Figure 4B:
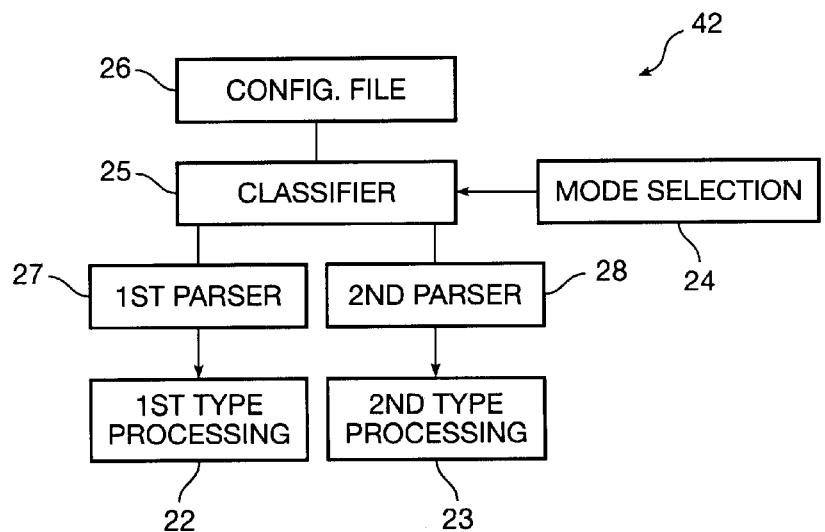
FIG. 4B is a functional block diagram schematically illustrating a configuration engine according to another presently preferred embodiment of the present invention.

FIG. 4B shows a configuration engine 42 according to an alternative embodiment of the present invention. The configuration engine 42 includes a classifier 25, a first parser 27, and the second parser 28. The classifier 25 classifies the instructions in the configuration file 26 into the first and second classes in the same manner as the classifier 21 as described above. The classifier 25 is capable of writing the instructions in different languages. In the first mode, the classifier 25 writes the first and second classes of instructions in a first language, and in the second mode the classifier 25 writes the second class of instructions in a second language. The first parser 27 parses instructions written in both the first and second languages, and the second parser 28 only parses instructions written in the second language. Thus, in the first mode, the first and second classes of instructions are read by the first parser 27 and executed accordingly, resulting in the first type of processing 22. In the second mode, only the second class of instructions are read by the second parser 28 and executed, resulting in the second type of processing 23. The operation of the mode selector 24 is the same as that in the configuration engine 40 discussed above.

Alternatively, the classifier 25 may write the first class of instructions in a first language, and the second class of instructions in a second language. The first parser 27 only parses instructions written in the first language, and the second parser 28 only parses instructions written in the second language. In the first mode, both the first and second parses 27 and 28 operate and the first and second classes of instructions are executed accordingly. In the second mode, only the second parser 28 operates and the second class of instructions are executed.

Figure 5:
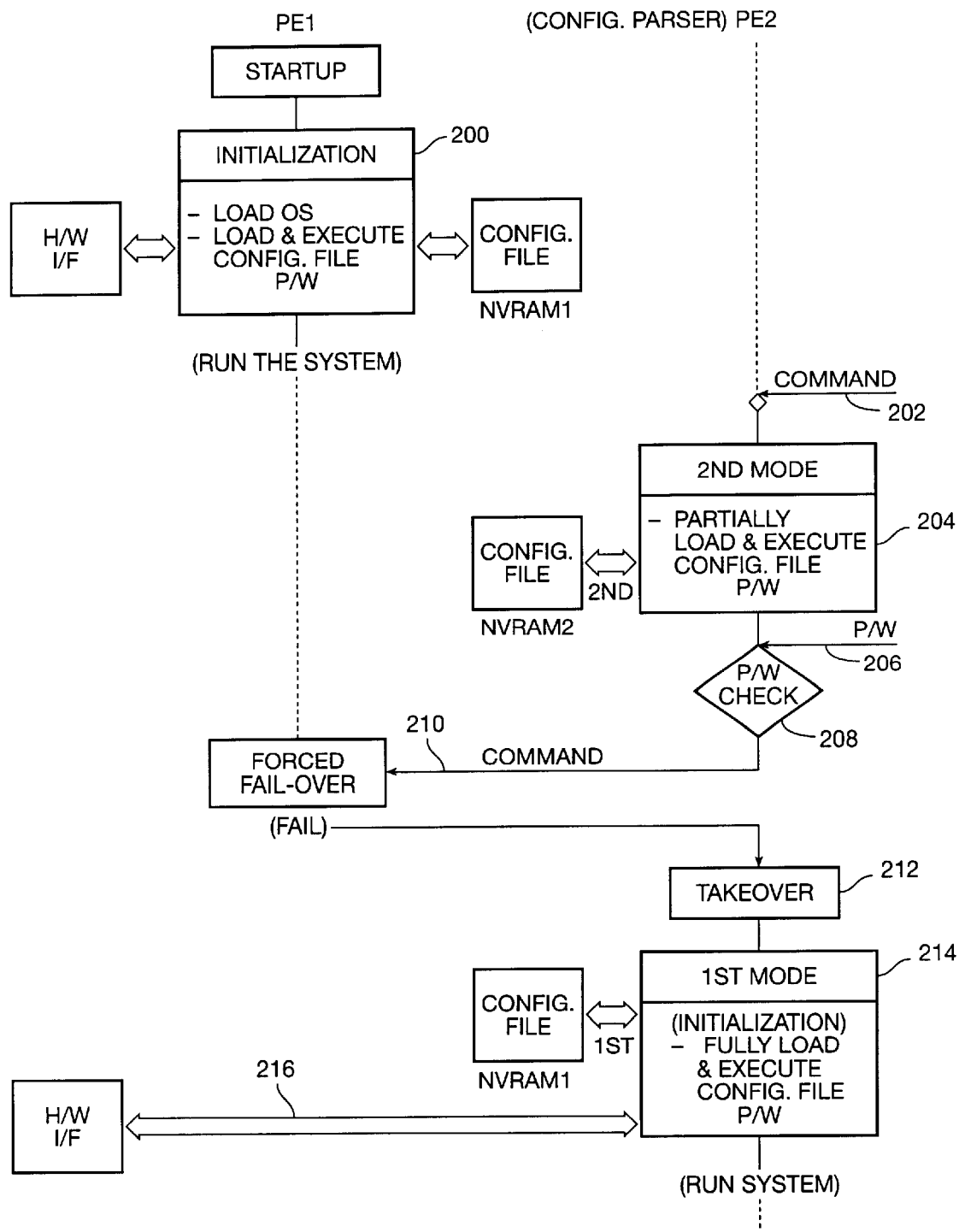
FIG. 5 is a process flow diagram illustrating an example of operations of a high reliability computer system according to one presently preferred embodiment of the present invention.

FIG. 5 schematically shows an example of operation of a high reliability computer system 100 according to one embodiment of the present invention. This example is only illustrative, and not for the purpose of limiting the present invention.

When the computer system 100 is started, the first PE 10 (PE1) performs the initialization process of the system, loading OS software and loading and executing the configuration file (200). Typically, the configuration file is read from the first memory 12 (NVRAM1) containing the initialization information for the first PE 10. During this initialization process, the first PE 10 sets parameters for the interfaces and other hardware of the system, that is, configures the shared as well as dedicated resources, and sets an enable password (P/W) along with other passwords according to the configuration information.

Suppose that in some situations a user such as a system administrator needs to control the computer system 100 using the second PE 14. The user makes an attempted access in a privileged mode to the system 100 through a console port for the second PE 14 (202). The second PE 14 has by that time already conducted or it then conducts a partial initialization and the configuration engine performs in the second mode (204). The configuration engine reads the second class of instructions from the initialization information contained in the second memory 16 (NVRAM2), and the second PE 14 partially loads and executes the configuration file accordingly. During this partial initialization process, an enable password (P/W) is set for the second PE 14 without configuring any hardware or interfaces off the second PE 14. This partial initialization process by the second PE 14 may be triggered by an attempted access (such as shown at step 202) by a user through the console port of PE 2. Alternatively, the second PE 14 may conduct the partial initialization process at any time before it takes over the first PE 10, for example, upon the startup of the computer system 100. The enable password may be stored in a RAM of the second PE 14 during or after the partial initialization.

The user is required to enter the enable password to obtain access to a privileged command mode (step 206). The second PE 14 may prompt the user to type the enable password. The second PE 14 checks the entered enable password comparing it with the enable password obtained through the partial initialization (step 208). If the password check is successful, the user is allowed to issue a privileged command, for example, forcing a failover of the first PE 10 (step 210). It should be noted that there may be many layers of privileged modes each having an enable password. In such a case, the enable password is a set of enable passwords, and the password check (step 208) is performed on the corresponding pair of entered and obtained enable passwords.

When the first PE 10 fails, either by being forced to fail or for any other reason, the second PE 14 substitutes for the first PE 10 (step 212). The control of the system 100 is switched to the second PE 14 and the second PE 14 conducts a full initialization process (step 214). The configuration engine performs in the first mode so that all instructions of the initialization information are loaded from the second memory 16 and executed by the second PE 14. The hardware and interfaces of the system 100 are re-configured by the second PE 14 (step 216). The configuration information for the second PE 14 may or may not be the same as that for the first PE 10.

In the case where the system 100 includes only the first PE 10 and the second PE 14, the first PE 10 will be the secondary PE after the second PE 14 takes the control of the system 100, becoming the primary. However, the system may be a multiple PE system including more than two PEs. In such a case, a third PE may become the secondary after the second PE 14 becomes the primary, and the first PE 10 may go out of service.

Figure 6:
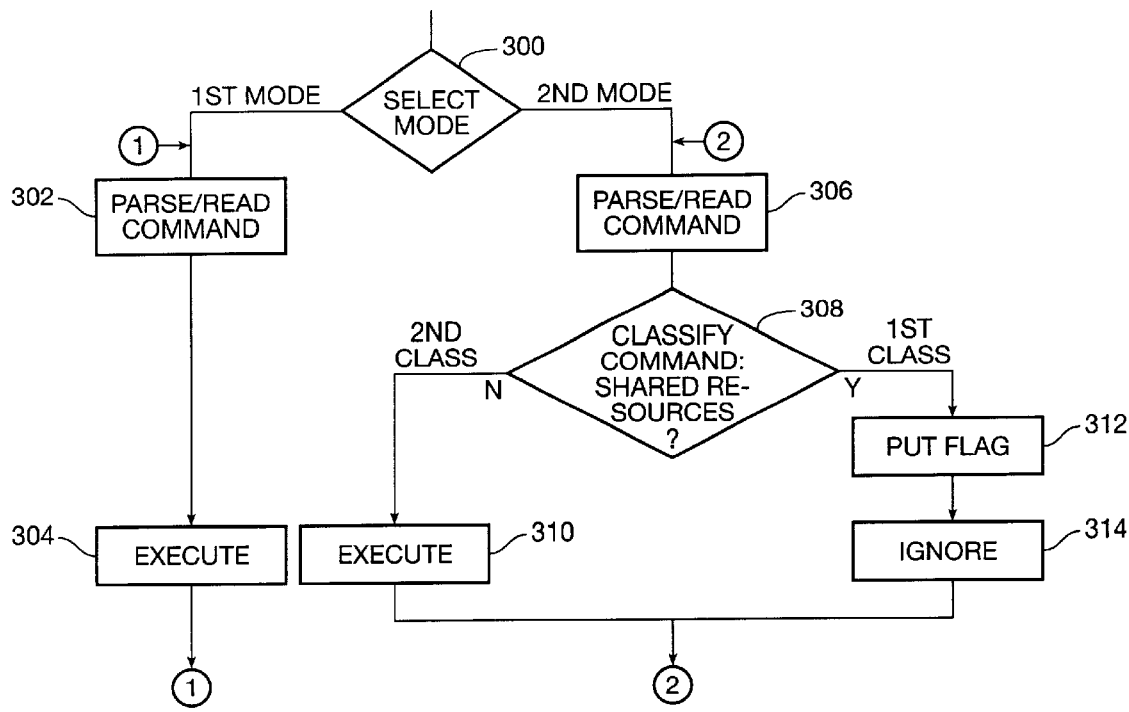
FIG. 6 is a process flow diagram illustrating an example of operations of a configuration engine according to one presently preferred embodiment of the present invention.

FIG. 6 shows an example of operation of the configuration engine and the second PE 14 according to one embodiment of the present invention. First, the configuration engine determines the mode in which it should operate (block 300). For example, the mode may be determined based on which PE is running the computer system 100, or whether the second PE 14 is operating as the primary PE or not. It should be noted that the mode is not necessarily "selected" by the configuration engine, but may be automatically set by simply inputting a flag, or the like, indicating the controlling (primary) PE. Then, the configuration file is parsed line-by-line. When the configuration engine operates in the first mode, each command is read (block 302) and executed accordingly (block 304). When the configuration engine operates in the second mode, each command is read (block 306) and classified into one of the two classes according to its nature; whether the command involves the shared resources or dedicated resources (block 308). If the command does not involve the shared resources and only involves the dedicated resources, it is categorized into the second class and executed (block 310). If the command involves the shared resources, the command is classified in the first class and ignored (block 314). This may be done, for example, by flagging the first class of commands with a flag bit (block 312), and ignoring all the commands with this flag bit set or in any other convenient manner.

It should be noted that reading a command in the first mode (block 302) and reading a command in the second mode (block 306) is the same operation when the command is read by the parser 20 of the configuration engine 40. The classification (block 308) and the execution (blocks 304, 310, and 314) of the commands depend on the mode.

According to one embodiment of the present invention, the high reliability computer system 100 includes a configuration engine for the first PE 10 as well as for the second PE 14. The configuration engine for the first PE 10 parses the initialization information contained in the first memory 12 in the same manner as the configuration engine for the second PE 14. After the control of the computer system 100 is switched to the second PE 14, the configuration engine for the first PE 10 operates in its second mode unless the second PE 14 fails and the control of the system 100 is switched back to the first PE 10. By performing the partial initialization process with the configuration engine operating in the second mode, the first PE 10 obtains an enable password without altering the configuration of the shared resources under control of the second PE 14. Therefore, while the second PE 14 is acting in the role of the primary PE, the ability to issue a command using the first PE 10 (through a console port for the first PE 10, for example) is protected by the enable password of the first PE 10.

More generally, when the system 100 is a multiple PE system, it may include one configuration engine per PE.

Each configuration engine operates in the first mode when the corresponding PE is working as the primary, and operates in the second mode when another PE is working as the primary. Accordingly, the ability to issue a command using any PE that is not currently the primary PE is also protected by the enable password of that PE.

Figure 7:
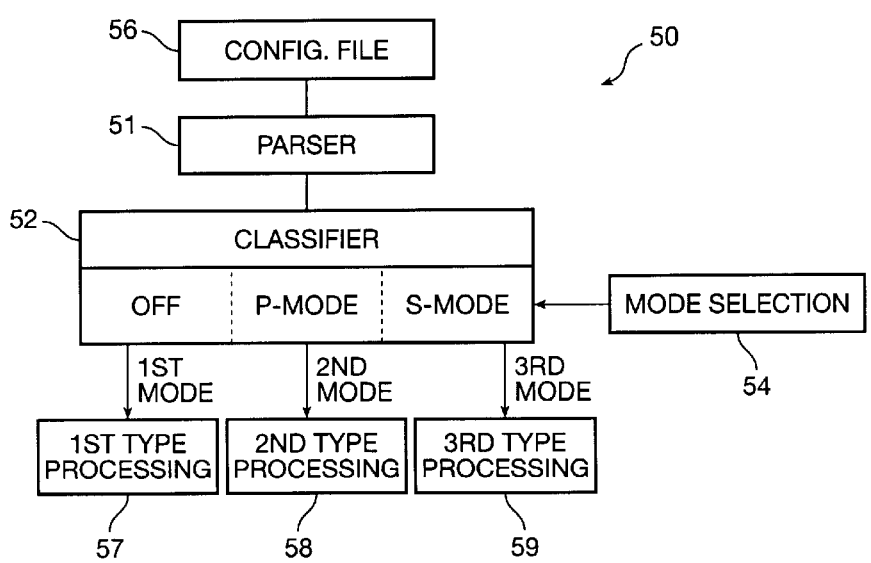
FIG. 7 is a functional block diagram schematically illustrating a multi-mode configuration engine according to one embodiment of the present invention.

FIG. 7 schematically shows functional components of a multi-mode configuration engine 50 according to one embodiment of the present invention. According to this embodiment, the multi-mode configuration engine 50 is capable of operating in a first mode, a second mode, and a third mode. The configuration engine 50 may be provided for the first PE 10 and/or the second PE 14. Preferably, the configuration engine 50 is provided for each PE in the system. In referring to the configuration engine 50 below, "the PE" is one PE for which the configuration engine 50 operates. The computer system 100 may include more than two PEs. In such a case, "another PE" or "the other PE" is one of the remaining PEs for which the configuration engine 50 does not operate.

As shown in FIG. 7, the configuration engine 50 includes a parser 51 and a classifier 52. The parser 51 parses the initialization information and reads the instructions contained in the configuration file 56. The classifier 52 identifies the nature of the instructions (commands) and categorizes the instructions into classes according to the identified nature. According to one embodiment of the present invention, the classifier 52 classifies the instructions of the configuration file 56 based on whether an instruction involves shared resources or dedicated resources, as defined above. This can be done, for example, with a lookup table or any convenient mechanism. In the first mode, the classifier 52 passes both the first and second classes of instructions read by the parser 51 to the PE so as to execute the full configuration (the first type of processing 57). In the second mode, the classifier 52 ignores the first class of instructions and passes only the second class of instructions to the PE, resulting in a partial configuration (the second type of processing 58). In the third mode, the classifier 52 passes the remaining instructions that have not been executed in the second type of processing 58. That is, in the third mode, the PE performs a supplemental configuration, executing the first class of instructions (the third type processing 59).

The configuration engine 50 may include a mode selector 54. The mode selector 54 decides the mode of operation of the classifier 52 based on whether the PE is starting and initializing the computer system 100, which PE is controlling the computer system 100 as the primary PE, and whether the PE has already performed a partial initialization. If the computer system 100 is being started and/or initialized by the PE, the mode selector 54 allows the classifier 52 to perform in the first mode. If the computer system 100 is under the control of another PE, the mode selector 54 lets the classifier 52 operate in the second mode. If the configuration engine 50 has already parsed and executed the configuration file 56 in the second mode, and now the control of the system 100 is switched to the PE, the mode selector 54 allows the classifier 52 to perform in the third mode. If the control of the system 100 is switched to the PE but the configuration file 56 has never executed by the configuration engine 50, the mode selector 54 selects the first mode. It should be noted that the mode is not necessarily "selected" by the mode selector 54, but may be automatically set by simply inputting one or more flags or the like indicating the controlling (primary) PE and the previous execution of the partial initialization, if any.

Figure 8:
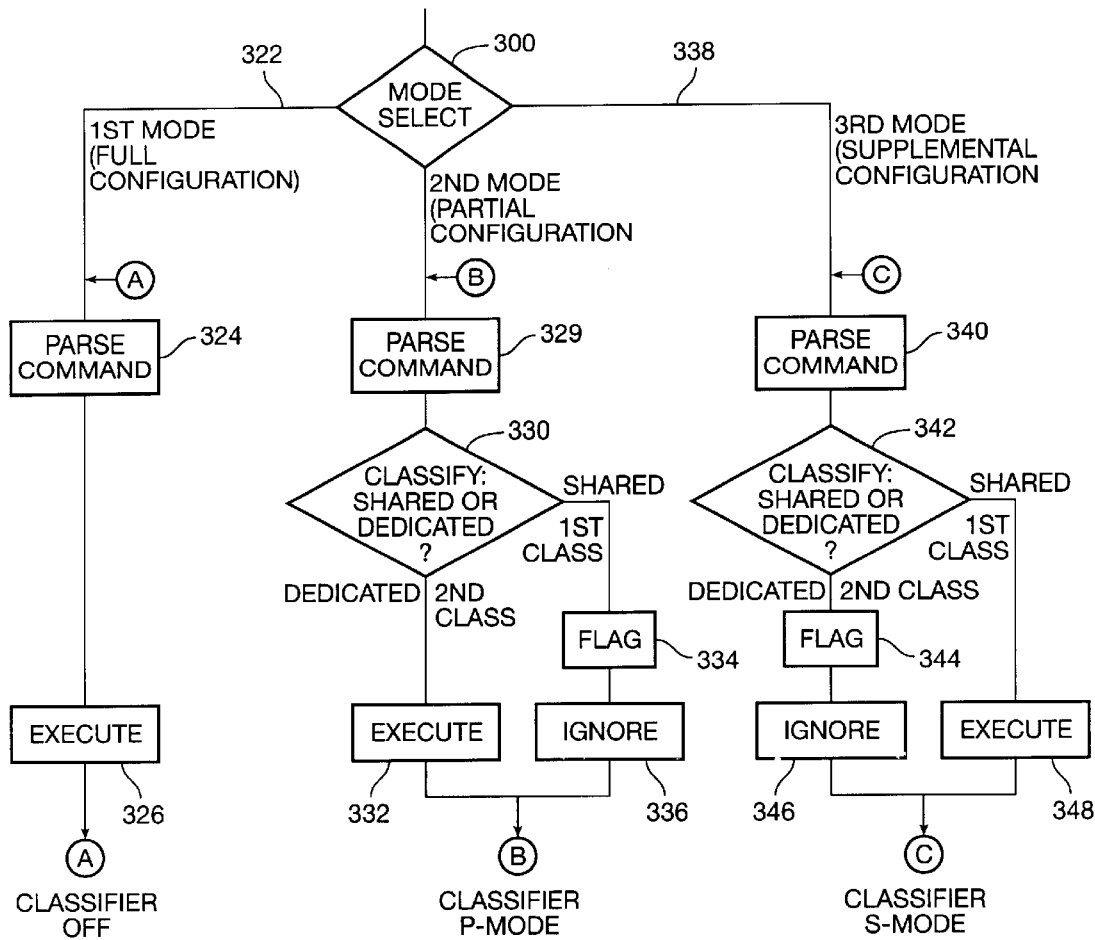
FIG. 8 is a process flow diagram illustrating an example of operations of a multi-mode configuration engine according to one embodiment of the present invention.

FIG. 8 shows an example of operations of the multi-mode configuration engine 50. First, the configuration engine 50 selects the mode in which it should operate (block 320). The first mode is selected when the PE is starting and initializing the computer system 100. The first mode is also selected when the PE conducts the initialization after the failure of another PE but the configuration file 56 is for the first time read by the configuration engine 50. The second mode is selected when another PE is running and controlling the computer system 100. The third mode is selected when the PE conducts the initialization of the system 100 when the configuration engine 50 has once read the configuration file 56 in the second mode. For example, the third mode is selected when the PE is reinitializing the computer system 100 after a forced failover of the other PE is caused though this PE.

In the first mode, the PE conducts the full configuration (step 322) and each command is read (block 324) and executed (block 326) line by line, regardless of the class. In other words, practically the classifier 52 does not conduct the classification in the first mode.

In the second mode, the PE performs a partial configuration (step 328), and each command is read (block 329) and classified into one of the two classes according to its nature; whether the command involves shared resources or dedicated resources (block 330). If the command involves the dedicated resources it is categorized into the second class and executed (block 332). If the command involves shared resources, the command is classified into the first class and ignored (block 336). This may be done, for example, by flagging the first class of commands with a flag bit (block 334) and ignoring all the commands with this flag bit lit.

In the third mode, the PE performs a supplemental configuration (step 338). In the third mode, the commands which were ignored in the second mode are now read and executed. Each command is read (block 340) and classified into the first class or the second class in accordance with its nature (block 342). If the command is classified into the second class (i.e., it has been executed in the second mode), it is ignored (346). This may be done, for example, by flagging the second class of commands with a flag bit (block 344) and ignoring all the commands with this flag bit set. If the command belongs to the first class and thus was ignored in the prior partial configuration, it is now executed accordingly (block 348).

In accordance with the embodiment as shown in FIGS. 7 and 8, the operation of the classifier 52 is mode specific, while the operation of the parser 51 is the same in either mode. In the first mode, the classification is not performed and the classifier 52 may be disabled or put into the "off" state. In the second mode (or "partial" mode), for example, the classifier 52 flags the first class of instructions so as to be ignored, while in the third mode (or "supplemental" mode) it flags the second class of instructions so as to be ignored. In each mode, commands without flag are executed and flagged commands are ignored.

Figure 9:
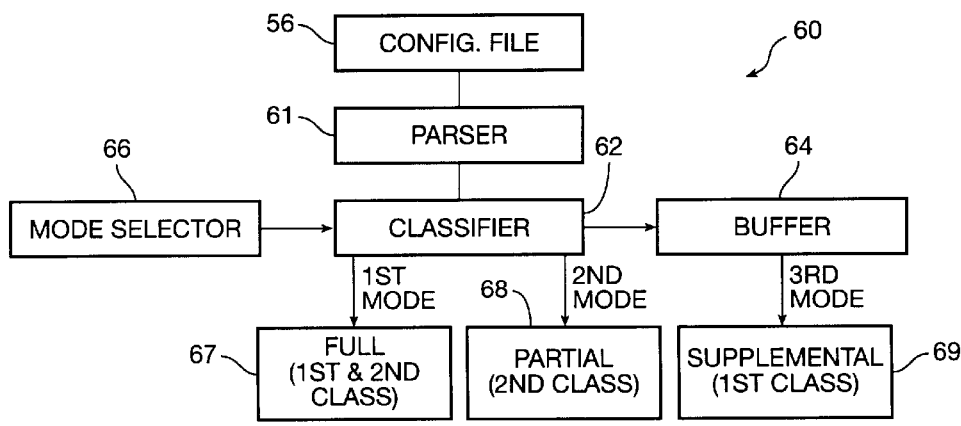
FIG. 9 is a functional block diagram schematically illustrating a hybrid configuration engine according to one embodiment of the present invention.

FIG. 9 schematically shows functional components of a hybrid configuration engine 60 according to one embodiment of the present invention. The hybrid configuration engine 60 may be provided for the first PE 10 and/or the second PE 14. In referring to the hybrid configuration engine 60 below, "the PE" is one PE for which the configuration engine 60 operates. The computer system 100 may include more than two PEs. In such a case, "another PE" or "the other PE" is one of the remaining PEs for which the configuration engine 60 does not operate.

As shown in FIG. 9, the configuration engine 60 includes a parser 61, a classifier 62, and a command buffer 64. The parser 61 reads instructions from the configuration file 56, and the classifier 62 identifies the nature of the instructions (commands) and categorizes the instructions into the classes according to the identified nature. The classifier 62 classifies the instructions of the configuration file 56 into the first and second classes of instructions based on whether an instruction involves the shared resources or dedicated resources, as defined above. This can be done, for example, with a lookup table or any convenient mechanism. The command buffer 64 may be a RAM associated with the configuration engine 60 or the PE.

The configuration engine 60 may include a mode selector 66. The mode selector 66 defines the first, second and third modes in the same manner as the mode selector 54 described above. In the first mode, the classifier 62 passes all of the read instructions to the PE, and the PE performs the full initialization (block 67). In the second mode, the classifier 62 passes only the second class of instructions after the classification, so that the PE performs a partial configuration (block 68). The classifier 62 may ignore the first class of instructions in the same manner as the classifier 52 in the second mode. At the same time, the classifier 62 stores the ignored (or unexecuted) first class of instructions in the command buffer 64. In the third mode, the classifier passes the stored first class of instructions from the command buffer 64 so that the PE executes the remaining instructions (supplemental configuration (block 69)). The parser 61 doesn't have to read the instructions from the configuration file 56 in the third mode.

Figure 10:
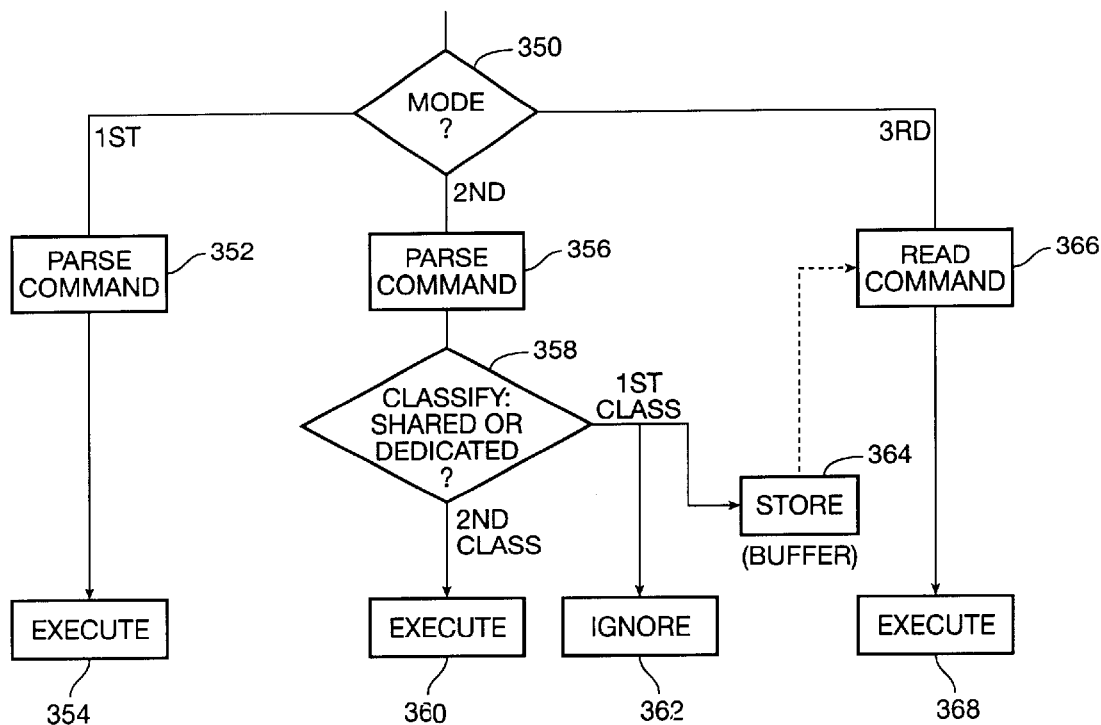
FIG. 10 is a process flow diagram illustrating an example of operations of a hybrid configuration engine according to one embodiment of the present invention.

FIG. 10 shows an example of operation of the hybrid configuration engine 60. First, the configuration engine selects the mode in which it should operate (block 350). The first mode is selected when the PE is starting and initializing the computer system 100. The first mode is also selected when the control of the system 100 is switched to the PE but the configuration file 56 has not yet been parsed by the parser 61 or the command buffer 64 is empty. The second mode is selected when another PE is controlling the computer system 100. The third mode is selected when the PE has the control over the computer system 100, and the configuration engine 60 has already read the configuration file 56 in the second mode and the first class of instructions have been stored in the command buffer 64. For example, the third mode is selected when the PE is reinitializing the computer system 100 after a forced failover of the other PE using this PE. These modes may be determined based on a flag indicating which PE is controlling the system 100 (i.e., operating as the primary) and a flag indicating whether the command buffer has its content.

In the first mode, the configuration engine 60 parses and reads all of the commands included in the initialization information: the first and second classes of instructions. Each command is read from the configuration file 56 (block 352) and executed (block 354), resulting in the full configuration by the PE.

In the second mode, each command is parsed and read from the configuration file 56 (block 356) and classified into one of the two classes according to its nature; whether the command involves shared resources or dedicated resources (block 358). If the command only involves dedicated resources, it is categorized into the second class and executed (block 360). If the command involves shared resources, the command is classified into the first class and ignored (block 362). This may be done, for example, by flagging the first class of commands with a flag bit, and ignoring all the commands with this flag bit lit. As a result, the PE performs a partial configuration. The commands that are classified into the first class (and thus ignored) are stored in the command buffer 64 (block 364).

In the third mode, the commands which have been ignored in the second mode are read from the command buffer 64 (block 366) and executed (block 368). Thus, in the third mode, the parser 61 does not parse the configuration file 56, but the PE performs a supplemental configuration by reading the commands from the command buffer 64. That is, the PE does not have to re-execute the commands that have already been executed in the second mode.

Figure 11:
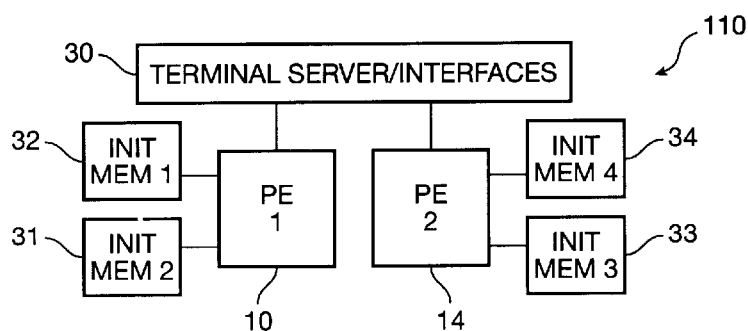
FIG. 11 is a system block diagram schematically illustrating a high reliability computer system in accordance with an alternate presently preferred embodiment of the present invention.

FIG. 11 schematically shows a high reliability computer system 110 in accordance with an alternate embodiment of the present invention. The computer system 110 includes a first PE 10, a first memory 31 and a second memory 32 both accessible by the first PE 10, a second PE 14, and a third memory 33 and a fourth memory 34 both accessible by the second PE 14. The first, second, third, and fourth memories 31, 32, 33 and 34 are typically non-volatile memories, such as NVRAM. In accordance with this embodiment, the initialization information for the first PE 10 is stored in two physically separate memories: the first memory 31 and the second memory 32. Similarly, the initialization information for the second PE 14 is stored in two physically separate memories: the third memory 33 and the fourth memory 34. The first and third memories 31 and 33 contain initialization information for the first and second PEs 10 and 16, respectively, including both the first and second classes of instructions. The second and fourth memories 32 and 34 also contain initialization information for the first and second PEs 10 and 14, respectively, but the initialization information includes only the second class of instructions involving resources dedicated to the respective PEs.

The system 110 includes a first configuration engine (not shown) for the first PE 10 and a second configuration engine (not shown) for the second PE 14. The first configuration engine allows the first PE 10 to perform the initialization process by executing instructions contained in either one of the first and second memories 31 and 32 depending on the mode of the initialization. Similarly, the second configuration engine allows the second PE 14 to perform the initialization process by executing instructions contained in either one of the third and fourth memories 33 and 34. The first configuration engine may include a database in which the first and second memories 31 and 32 are integrated, and the second configuration engine may include a database having the third and fourth memories 33 and 34.

As in the computer system 100, the first PE 10 is a primary PE controlling the computer system 110. The initialization information in the first memory 31 is used for a full configuration process in the first mode. The first mode initialization is performed when the first PE 10 (as the primary PE) starts the computer system 110, or when the control of the computer system 110 is switched back to the first PE 10 from the second PE 14 (or from any other PE if the computer system 100 includes more than to PEs).

The second memory 32 is used for a partial configuration process in the second mode. The second mode initialization is performed when the first PE 10 operates in the role of a secondary PE backing-up the second PE 14 (or any other PE when there are more than two PEs in the system 110). By loading and executing the initialization information from the second memory 32, the first PE 10 obtains an enable password for the first PE 10 without interacting with the shared resources: the interfaces and other hardware which are under the control of the second PE 14. Thus, the computer system 110 is also password-protected for commands issued through the first PE 10 while the second PE 14 is controlling the computer system 110.

When a failure of the first PE 10 (operating as the primary) is detected, switching circuitry (not shown) switches control of the system 110 to the second PE 14. The second PE 14, when it takes over the first PE 10, conducts the first mode initialization process using the initialization information contained in the third memory 33. That is, the second PE 14 fully executes configuration instructions of the first and second classes. Otherwise, the second PE 14 performs the second mode initialization using the initialization information contained in the fourth memory 34, executing only the second class of instructions. By this partial initialization, the second PE 14 configures only its dedicated resources and obtains its password protection without accessing the shared resources.

The computer system 110 may include more than two PEs with two types of memory provided for each PE. In such a case, the primary PE may not become the secondary PE after the secondary takes over to become the primary, but a third PE may become the secondary.

Figure 12:
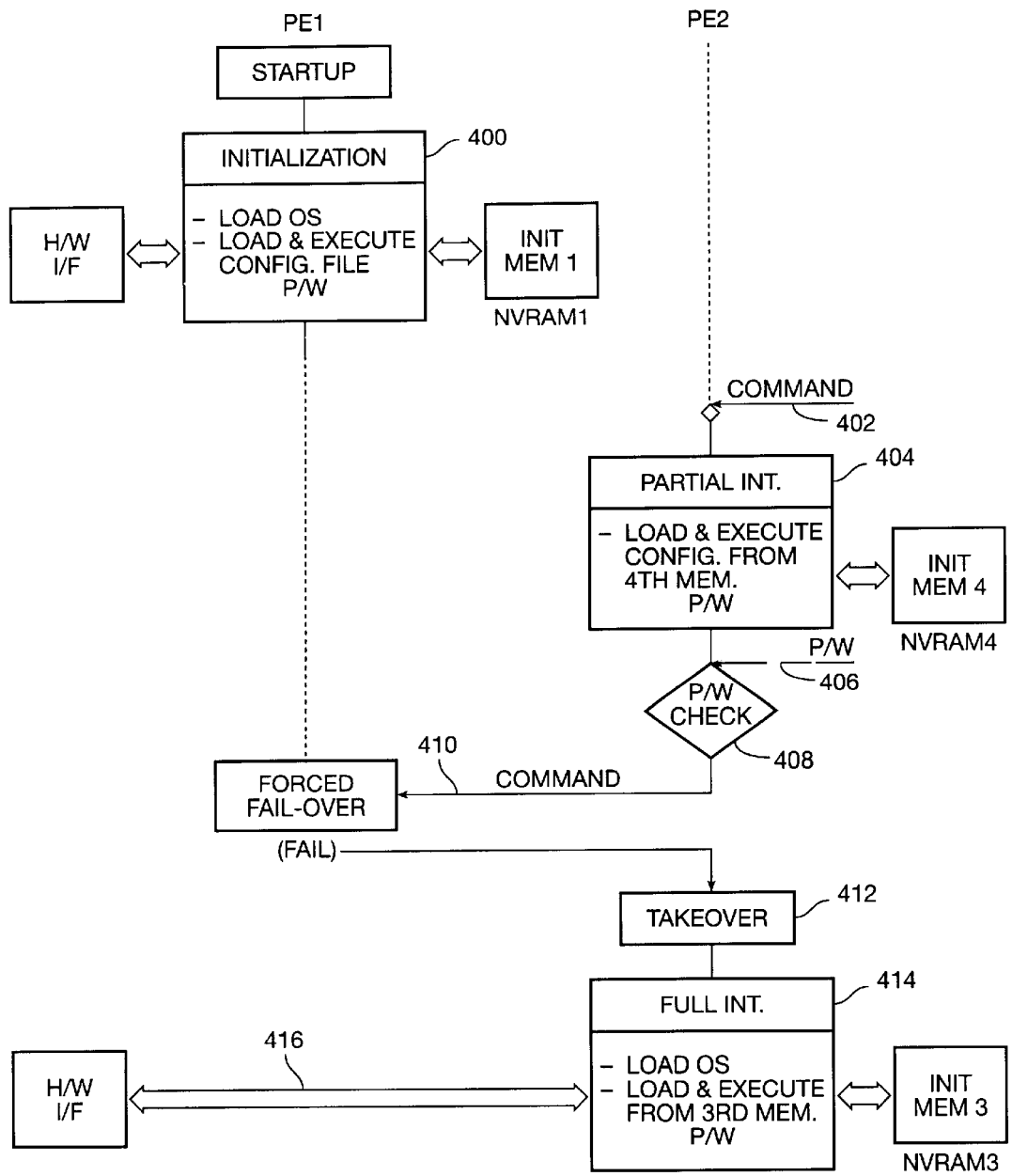
FIG. 12 is a process flow diagram illustrating an exemplary operation of a high reliability computer system according to one presently preferred embodiment of the present invention.

FIG. 12 schematically shows an example of operation of the high reliability computer system 110. When the computer system 110 is started, the first PE 10 (PE1) initializes the system 110 in the same manner as the computer system 100 (block 400) discussed above.

As discussed above, there may be some situations where a user such as a system administrator needs to access the computer system 110 and issue a command using the second PE 14 (PE2). In such situations the user makes an attempted access via a privileged mode through a console port for the second PE 14 (step 402). The second PE 14 conducts a partial initialization process by executing the initialization instructions stored in the fourth memory 34 (NVRAM4) (block 404). This partial initialization process sets an enable password for the second PE 14 without configuring the shared resources. The partial initialization process may be triggered by such an attempted access by a user through the second console port. Alternatively, the second PE 14 may conduct the partial initialization at any time before it takes over the first PE 10, for example, upon the startup of the computer system 110. The enable password may be stored in a RAM of the second PE 14 after such a partial initialization.

The user is required to enter the enable password to obtain access to a privileged command mode (step 406). The second PE 14 may prompt the user to enter the enable password. The second PE 14 checks the entered enable password comparing with the stored enable password P/W (block 408). If the password check is successful, the user will be allowed to issue a privileged command, for example, changing the configuration or forcing a failover of the first PE 10 (step 410).

When the first PE 10 fails, either by being forced to fail or for any other reason, the second PE 14 takes over the first PE 10 (block 412). The control of the system 110 is switched to the second PE 14 and the second PE 14 conducts a full initialization process (block 414), by parsing the initialization information stored in the third memory 33 (NVRAM3) (418). In this process, all of the first and second classes of instructions are executed, and the hardware and interfaces of the system 110 are re-configured by the second PE 14 (block 416).

According to the present invention as described above, the second PE obtains an enable password without configuring shared resources of the system. That is, when the computer system is under the control of the first PE, issuing a command using the second PE is also protected by the enable password of the second PE. Thus, an enhanced reliability, such as maintaining the high performance of the system, is realized without creating a security lapse in the system.

It should also be noted that the term "password" as used herein is intended to be broad enough to encompass surrogates for conventional passwords. These include "shared secret" mechanisms, encrypted passwords, and mechanisms employing secure password servers. Password files relating users to their respective passwords and privileges may also be employed. Thus, as used herein, the term "password" is a mechanism of any character employed to distinguish whether a particular identified user is authorized to use a particular command or set of commands.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A high reliability computer system, said system comprising:
    a first processing engine (PE) and a second processing engine (PE);
    circuitry for switching control of said system from said first PE operating as a primary PE to said second PE upon detection of a failure of said first PE;
    at least one shared resource associated with both said first and second PEs;
    at least one dedicated resource associated with said first PE and at least one dedicated resource associated with said second PE;
    a database associated with and accessible by one of said first and second PEs, containing initialization information for said one PE, said initialization information including a first class of instructions affecting said shared resource and a second class of instructions affecting said dedicated resource of said one PE, said second class of instructions including setting an enable password for said one PE; and
    a configuration engine associated with said one PE, operable in one of a first mode and a second mode, said configuration engine allowing said one PE to execute said first and second classes of instructions in said first mode and allowing said one PE to execute said second class of instructions in said second mode.

2. A high reliability computer system according to claim 1, wherein said configuration engine operates in said first mode when said one PE is controlling said system as a primary PE and operates in said second mode when another PE is controlling said system as the primary PE.

3. A high reliability computer system according to claim 1, wherein said configuration engine comprises a mode selector for selecting said first mode when said one PE is controlling said system as a primary PE and selecting said second mode when another PE is controlling said system as the primary PE.

4. A high reliability computer system according to claim 1, wherein said configuration engine comprises a parser for parsing instructions included in said initialization information.

5. A high reliability computer system according to claim 4, wherein said configuration engine comprises a classifier for classifying parsed instructions into said first class and said second class.

6. A high reliability computer system according to claim 5, wherein in said first mode said classifier passes both said first and second classes of instructions to said one PE for execution.

7. A high reliability computer system according to claim 5, wherein in said second mode said classifier passes said second class of instructions to said one PE for execution and ignores said first class of instructions.

8. A high reliability computer system according to claim 1, wherein said configuration engine comprises a classifier for classifying instructions included in said initialization information into said first class and said second class.

9. A high reliability computer system according to claim 8, wherein said classifier writes said first class of instructions in a first language and said second class of instructions in a second language.

10. A high reliability computer system according to claim 9, wherein said configuration engine further comprises:
    a first parser operating in said first mode, for parsing instructions written in said first language; and
    a second parser operating in both said first and second modes, for parsing instructions written in said second language.

11. A high reliability computer system according to claim 8, wherein said classifier writes said first and second classes of instructions in a first language in said first mode, and writes said second class of instructions in a second language in said second mode.

12. A high reliability computer system according to claim 11, wherein said configuration engine further comprises:
    a first parser for only parsing instructions written in said first language; and
    a second parser for only parsing instructions written in said second language.

13. A high reliability computer system according to claim 1, wherein said database comprises:
    a first memory for use in said first mode, containing initialization information including said first and second classes of instructions; and
    a second memory for use in said second mode, containing initialization information including said second class of instructions.

14. A high reliability computer system, said system comprising:
    a first processing engine (PE) and a second processing engines (PE);
    circuitry for switching control of said system from said first PE operating as a primary PE to said second PE upon detection of a failure of said first PE;
    at least one shared resource associated with both said first and second PEs;
    at least one dedicated resource associated with said first PE and at least one dedicated resource associated with said second PE; and
    a database associated with and accessible by one of said first and second PEs, containing initialization information for said one PE, said database including
        a first memory storing initialization information including a first class of instructions affecting said shared resource and a second class of instructions affecting said dedicated resource of said one PE, said second class of instructions including setting of an enable password for said one PE, and a second memory storing initialization information only including said second class of instructions affecting said dedicated resource of said one PE, said second class of instructions including setting of an enable password for said one PE.

15. A multi-mode configuration engine for a processing engine (PE) in a multiple PE system, said system including a first and a second PEs, circuitry for switching control of said system from said first PE operating as a primary PE to said second PE upon detection of a failure of said first PE, at least one shared resource associated with both said first and second PEs, at least one dedicated resource associated with said first PE, and at least one dedicated resource associated with said second PE, said configuration engine comprising:

a database containing initialization information for one of said first and second PEs, said initialization information including a first class of instructions affecting said shared resource and a second class of instructions affecting said dedicated resource of said one PE, said second class of instructions including setting an enable password for said one PE; and a mode selector for selecting a first mode when said one PE is controlling the system as the primary PE, and for selecting a second mode when another PE is controlling the system as the primary PE, said configuration engine allowing said one PE to execute said first and second classes of instructions in said first mode and allowing said one PE to execute said second class of instructions in said second mode.

16. A multi-mode configuration engine according to claim 15, further comprising a parser for parsing instructions included in said initialization information.

17. A multi-mode configuration engine according to claim 16, further comprising a classifier for classifying parsed instructions into said first class and said second class.

18. A multi-mode configuration engine according to claim 17, wherein said classifier passes said second class of instructions to said one PE for execution and ignores said first class of instructions in said second mode.

19. A multi-mode configuration engine according to claim 18, wherein said classifier passes both said first and second classes of instructions to said one PE for in said first mode.

20. A multi-mode configuration engine according to claim 15, wherein said database includes:

a first memory for use in said first mode, storing initialization information including said first and second classes of instructions; and a second memory for use in said second mode, storing initialization information including said second class of instructions.

21. A method for operating a high reliability computer system, said system including a first processing engine (PE) and a second processing engine (PE), at least one shared resource associated with both said first and second PEs, at least one dedicated resource associated with said first PE, at least one dedicated resource associated with said second PE, and a database associated with and accessible by one of said first and second PEs, said database containing initialization information for said one PE, said initialization information including a first class of instructions affecting said shared resource and a second class of instructions affecting said dedicated resource of said one PE, said second class of instructions including setting an enable password for said one PE, said method comprising:

switching control of said system from said first PE operating as a primary PE to said second PE upon detection of a failure of said first PE;

allowing said one PE to execute said first and second classes of instructions in a first mode when said one PE is controlling the computer system as a primary PE; and allowing said one PE to execute said second class of instructions in a second mode when another PE is controlling the computer system as the primary PE.

22. A method according to claim 21, further comprising parsing instructions included in said initialization information.

23. A method according to claim 22, further comprising classifying parsed instructions into said first class and said second class.

24. A method according to claim 23, further comprising:

passing both said first and second classes of instructions to said one PE for execution in said first mode; and passing said second class of instructions to said one PE for execution and ignores said first class of instructions in said second mode.

25. A method for operating a high reliability computer system, said system including a first processing engine (PE) and a second processing engine (PE), at least one shared resource associated with both said first and second PEs, at least one dedicated resource associated with said first PE, a last one dedicated resource associated with said second PE, and a database associated with and accessible by one of said first and second PEs, said database containing initialization information for said one PE, said method comprising:

switching control of said system from said first PE operating as a primary PE to said second PE upon detection of a failure of said first PE;

classifying said initialization information into a first class of instructions affecting said shared resource and a second class of instructions affecting said dedicated resource of said one PE, said second class of instructions including setting an enable password for said one PE;

allowing said one PE to execute said first and second classes of instructions in a first mode when said one PE is controlling the computer system as a primary PE; and allowing said one PE to execute said second class of instructions in a second mode when another PE is controlling the computer system as the primary PE.

26. A method of providing password protection for a high reliability computer system, said system including a first processing engine (PE) and a second processing engine (PE), at least one shared resource associated with both said first and second PEs, at least one dedicated resource associated with said first PE, at least one dedicated resource associated with said second PE, a database associated with and accessible by one of said first and second PEs, and circuitry for switching control of said system from said first PE operating as a primary PE to said second PE upon detection of a failure of said first PE, said method comprising:

classifying instructions included in said initialization information into a first class of instructions affecting said shared resource and a second class of instructions affecting said dedicated resource of said one PE, said second class of instructions including setting an enable password for said one PE;

allowing said one PE to execute said first and second classes of instructions in a first mode when said one PE is controlling the computer system as a primary PE; and allowing said one PE to execute said second class of instructions in a second mode when another PE is controlling the computer system as the primary PE.

27. A method for operating a high reliability computer system, said system including a first processing engine (PE) and a second processing engine (PE), at least one shared resource associated with both said first and second PEs, at least one dedicated resource associated with said first PE, at least one dedicated resource associated with said second PE, and a database associated with and accessible by one of said first and second PEs, containing initialization information for said one PE, said method comprising:

switching control of said system from said first PE operating as a primary PE to said second PE upon detection of a failure of said first PE;

providing a memory storing first initialization information including a first class of instructions affecting said shared resource and a second class of instructions affecting said dedicated resource of said one PE, said second class of instructions including setting an enable password for said one PE;

providing a second memory storing second initialization information including said second class of instructions;

allowing said one PE to execute said first and second classes of instructions in a first mode by reading instructions from said first memory when said one PE is controlling the computer system as a primary PE; and allowing said one PE to execute said second class of instructions in a second mode by reading from said second memory when another PE is controlling the computer system as the primary PE.

28. A program storage device readable by a machine, tangibly embodying a program of instructions executable by the machine to perform method for operating a high reliability computer system, said system including a first processing engine (PE) and a second processing engine (PE), at least one shared resource associated with both said first and second PEs, at least one dedicated resource associated with said first PE, a last one dedicated resource associated with said second PE, and a database associated with and accessible by one of said first and second PEs, said database containing initialization information for said one PE, said method comprising:

switching control of said system from said first PE operating as a primary PE to said second PE upon detection of a failure of said first PE;

classifying said initialization information into a first class of instructions affecting said shared resource and a second class of instructions affecting said dedicated resource of said one PE, said second class of instructions including setting an enable password for said one PE;

allowing said one PE to execute said first and second classes of instructions in a first mode when said one PE is controlling the computer system as a primary PE; and allowing said one PE to execute said second class of instructions in a second mode when another PE is controlling the computer system as the primary PE.

29. A program storage device readable by a machine, tangibly embodying a program of instructions executable by the machine to perform method for providing password protection for a high reliability computer system, said system including a first processing engine (PE) and a second processing engine (PE), at least one shared resource associated with both said first and second PEs, at least one dedicated resource associated with said first PE, at least one dedicated resource associated with said second PE, a database associated with and accessible by one of said first and second PEs, and circuitry for switching control of said system from said first PE operating as a primary PE to said second PE upon detection of a failure of said first PE, said method comprising:

classifying instructions included in said initialization information into a first class of instructions affecting said shared resource and a second class of instructions affecting said dedicated resource of said one PE, said second class of instructions including setting an enable password for said one PE;

allowing said one PE to execute said first and second classes of instructions in a first mode when said one PE is controlling the computer system as a primary PE; and allowing said one PE to execute said second class of instructions in a second mode when another PE is controlling the computer system as the primary PE.

* * * * *